United States Patent
Fujita

[19]

[11] Patent Number: 5,930,726
[45] Date of Patent: Jul. 27, 1999

[54] MOBILE COMMUNICATION WITHOUT CALL INTERRUPTION DURING TRANSITION BETWEEN OUTDOOR AND INDOOR MODES

[75] Inventor: Toshiki Fujita, Tokyo, Japan

[73] Assignee: NEC Corporation, Tokyo, Japan

[21] Appl. No.: 08/784,925

[22] Filed: Jan. 16, 1997

[30] Foreign Application Priority Data

Jan. 19, 1996 [JP] Japan .................................. 8-007336

[51] Int. Cl.⁶ ........................................................ H04B 1/00
[52] U.S. Cl. ........................ 455/555; 455/561; 455/562; 455/20
[58] Field of Search ............................. 455/7, 11.1, 15, 455/20, 555, 561, 562

[56] References Cited

U.S. PATENT DOCUMENTS

| | | | |
|---|---|---|---|
| 5,142,691 | 8/1992 | Freeburg | 455/63 |
| 5,189,432 | 2/1993 | Lombardi et al. | 343/739 |
| 5,235,632 | 8/1993 | Raith | 455/448 |
| 5,349,631 | 9/1994 | Lee | 455/555 |
| 5,404,570 | 4/1995 | Charas et al. | 455/446 |
| 5,533,027 | 7/1996 | Akerburg et al. | 455/15 |
| 5,604,789 | 2/1997 | Lerman | 455/20 |
| 5,754,943 | 5/1998 | Arai et al. | 455/69 |

FOREIGN PATENT DOCUMENTS

| | | | |
|---|---|---|---|
| 6-338849 | 12/1994 | Japan . | |
| H7-154850 | 6/1995 | Japan | H04Q 7/36 |
| 7-203517 | 8/1995 | Japan . | |
| H7-203517 | 8/1995 | Japan | H04Q 7/22 |
| H7-312775 | 11/1995 | Japan | H04Q 7/34 |
| H8-181650 | 7/1996 | Japan | H04B 7/26 |
| H8-265249 | 10/1996 | Japan | H04B 7/26 |
| H8-265250 | 10/1996 | Japan | H04B 7/26 |
| H8-275229 | 10/1996 | Japan | H04Q 7/36 |
| H9-191282 | 7/1997 | Japan | H04B 7/15 |
| H9-200107 | 7/1997 | Japan | H04B 7/15 |
| H9-214418 | 8/1997 | Japan | H04B 7/26 |

*Primary Examiner*—Reinhard J. Eisenzopf
*Assistant Examiner*—Makoto Aoki
*Attorney, Agent, or Firm*—Young & Thompson

[57] ABSTRACT

A mobile communication system having a base station and a mobile station, provided with indoor and outdoor antennas in different locations of a building structure that substantially prevents penetration of electromagnetic radiation. A communication unit is connected between the indoor and outdoor antennas. The communication unit is arranged to detect a signal received at the indoor antenna from the mobile station while the mobile station is communicating with the base station, determines that the mobile station is entering the structure when the detected signal exceeds a predetermined reference level and establishes a radio link between the outdoor antenna and the base station and a circuit between the indoor and outdoor antennas and commands the mobile station to establish a radio link to the indoor antenna. The radio link established between the mobile station and the indoor antenna uses forward and reverse channels that avoid interference with other mobile stations.

10 Claims, 2 Drawing Sheets

MOBILE COMMUNICATION WITHOUT CALL INTERRUPTION DURING TRANSITION BETWEEN OUTDOOR AND INDOOR MODES

BACKGROUND OF THE INVENTION

1. Field of the Invention

The present invention relates generally to mobile communication systems, and more specifically to a mobile communication system wherein mobile stations have outdoor and indoor modes of operation.

2. Description of the Related Art

A prior art technique as typically disclosed in Japanese Laid-Open Patent Specification Hei-4-23340 involves the use of radio communication for outdoor use and optical communication for indoor use. The use of optical communication medium for indoor use is to avoid interference with other mobile stations. However, if a mobile station is entering a building from the outside while communicating with a base station, the ongoing call must be interrupted to switch over to the optical communication mode if the user still desires to continue the communication.

Therefore, a need for uniterrupted communication exists for mobile stations when they change modes between outdoor communication and indoor communication.

SUMMARY OF THE INVENTION

It is therefore an object of the present invention to provide a method and system for uninterrupted mobile communication when a mobile station changes modes between outdoor communication and indoor communication.

According to a first aspect, the present invention provides a mobile communication method comprising providing first and second radio access points in different locations of a building structure that substantially prevents penetration of electromagnetic radiation, receiving a signal at the first radio access point from a mobile station while communicating with a base station and determining that the mobile station is entering the structure when the received signal exceeds a predetermined reference level, and establishing a radio link between the second radio access point and the base station and a circuit between the first and second radio access points, and commanding the mobile station to establish a radio link to the first radio access point.

The method additionally determines that the mobile station is leaving the structure when the signal received at the first radio access point lowers below an additional reference level, and commands the mobile station to establish a radio link to the base station. Preferably, the method further includes making a search through a spectrum of a mobile communication system at periodic intervals for an idle channel which suffers no interference with other mobile stations, and communicating the detected idle channel to the mobile station to establish the radio link to the first radio access point.

According to a second aspect, the present invention provides a mobile communication system having a base station and a mobile station. The system comprises indoor and outdoor antennas in different locations of a building structure that substantially prevents penetration of electromagnetic radiation, and a communication unit connected between the indoor and outdoor antennas. The communication unit is arranged to detect a signal received at the first antenna from the mobile station while the mobile station is communicating with the base station, determines that the mobile station is entering the structure when the detected signal exceeds a predetermined reference level and establishes a radio link between the outdoor antenna and the base station and a circuit between the first and second antennas and commands the mobile station to establish a radio link to the indoor antenna.

BRIEF DESCRIPTION OF THE DRAWINGS

The present invention will be described in further detail with reference to the accompanying drawings, in which.

DETAILED DESCRIPTION

Figure 1:
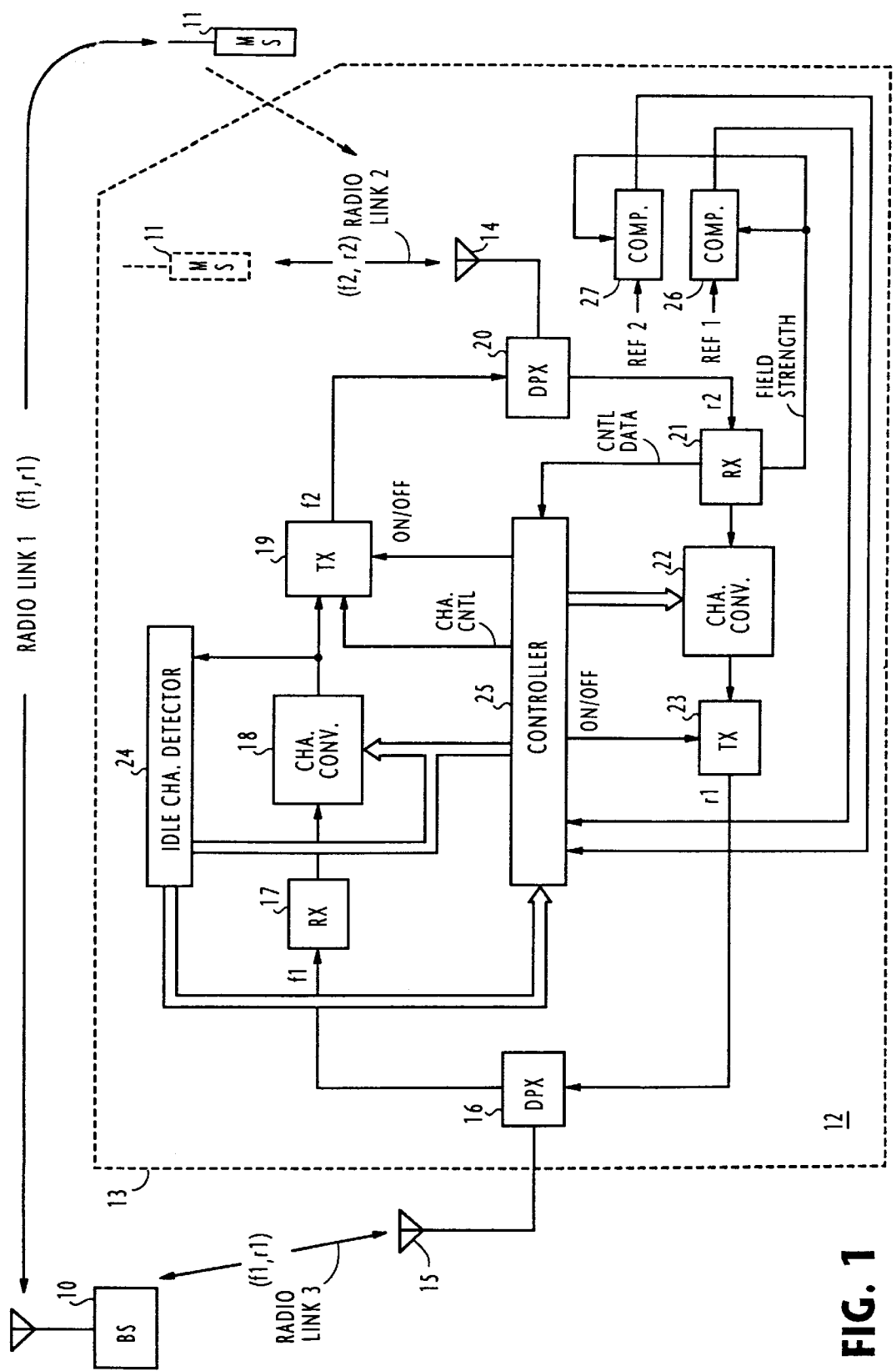
FIG. 1 is a block diagram of a mobile communication system of the present invention.

In FIG. 1, there is shown a cellular mobile communication system according to one embodiment of the present invention. The system includes a cell-site base station 10, a mobile station 11 and a local communication unit 12 located inside of a building 13 or any structure that substantially hinders the penetration of electromagnetic radiation from the base station to the interior of the building. The mobile station 11 establishes a radio link 1 with the base station when it is used outdoors. Forward channel (base-to-mobile) F1 and reverse channel (mobile-to-base) R1 are carried on the radio link 1. An indoor antenna 14 is provided in the building 13 as a first access point to establish a radio link 2 between the local communication unit 12 and the mobile station 11 as the latter enters the building 13 from the outside while continuing communication with the base station. Radio link 2 carries forward channel F2 and reverse channel R2. An outdoor antenna 15 is provided in a different location of the building 13 from the location of the indoor antenna 14. This outdoor antenna is used as a second access point to establish a radio link 3 between the local communication unit 12 and the base station 10 when the mobile station 11 is in the building 13. Radio link 3 carries the same forward and reverse channels as those of the radio link 1. As will be described, when the radio links 2 and 3 are established, the radio link 1 is cleared.

The local communication unit 12 includes a duplexer 16 through which a forward-channel signal from the base station 10 is supplied to an RF receiver 17 where it is amplified and fed to a channel converter 18. The output of channel converter 18 is coupled to a transmitter 19 where it is amplified and applied through a duplexer 20 to antenna 14 for local transmission.

A signal received by the indoor antenna 14 is supplied via duplexer 20 to an RF receiver 21, where it is amplified and fed to a channel converter 22. The output of channel converter 22 is amplified by a transmitter 23 and applied to antenna 15 via duplexer 16 for transmission to the base station.

Each of the channel converters 18 and 22 includes a channel synthesizer, not shown, which responds to channel conversion data from a controller 25 to provide conversion of an input channel to an output channel so that the forward channel of radio link 3 is converted to the forward channel of radio link 2 and the reverse channel of radio link 2 is converted to the reverse channel of radio link 3.

An idle channel detector 24 is provided to supply a channel select command signal to the channel converter 18 to cause it to scan across the spectrum of all channels allocated to the mobile communication system. This command signal is produced at periodic intervals (24-hour intervals, for example) to obtain field strength data of the system's spectrum, determines idle channels that can be used to establish the radio link 2. If base stations of other mobile communication systems are installed in a nearby location, the idle channel finder 24 determines idle channels that avoid interference with other mobile stations of the same system as well as those of other systems.

A field strength signal that indicates the strength of a mobile-transmitted signal is obtained by the receiver 21 from control channel separated from speech channel. This field strength signal is applied to a comparators 26 and 27 for comparison with first and second reference levels REF 1 and REF 2, respectively.

When the field strength of a signal received by antenna 14 exceeds the first reference level REF 1, it is determined that the mobile station 11 is entering the building 13 and comparator 26 produces an output signal. Controller 25 responds to the output signal of comparator 26 by initiating a channel switching operation whereby the communication path between the mobile station 11 and the base station 10 is switched from link 1 to a series of links 2 and 3 to enable the mobile station to continue its communication in a manner as will be described in detail with reference to the flowchart of FIG. 2.

When the field strength signal from receiver 21 becomes lower than the second reference level REF 2, it is determined that the mobile station is leaving the building while continuing the communication with the base station. When this occurs, comparator 27 supplies an output signal to controller 25. In response, controller 25 switches the communication path from the series of links 2 and 3 to the link 1 to enable the mobile station to continue the communication.

Figure 2:
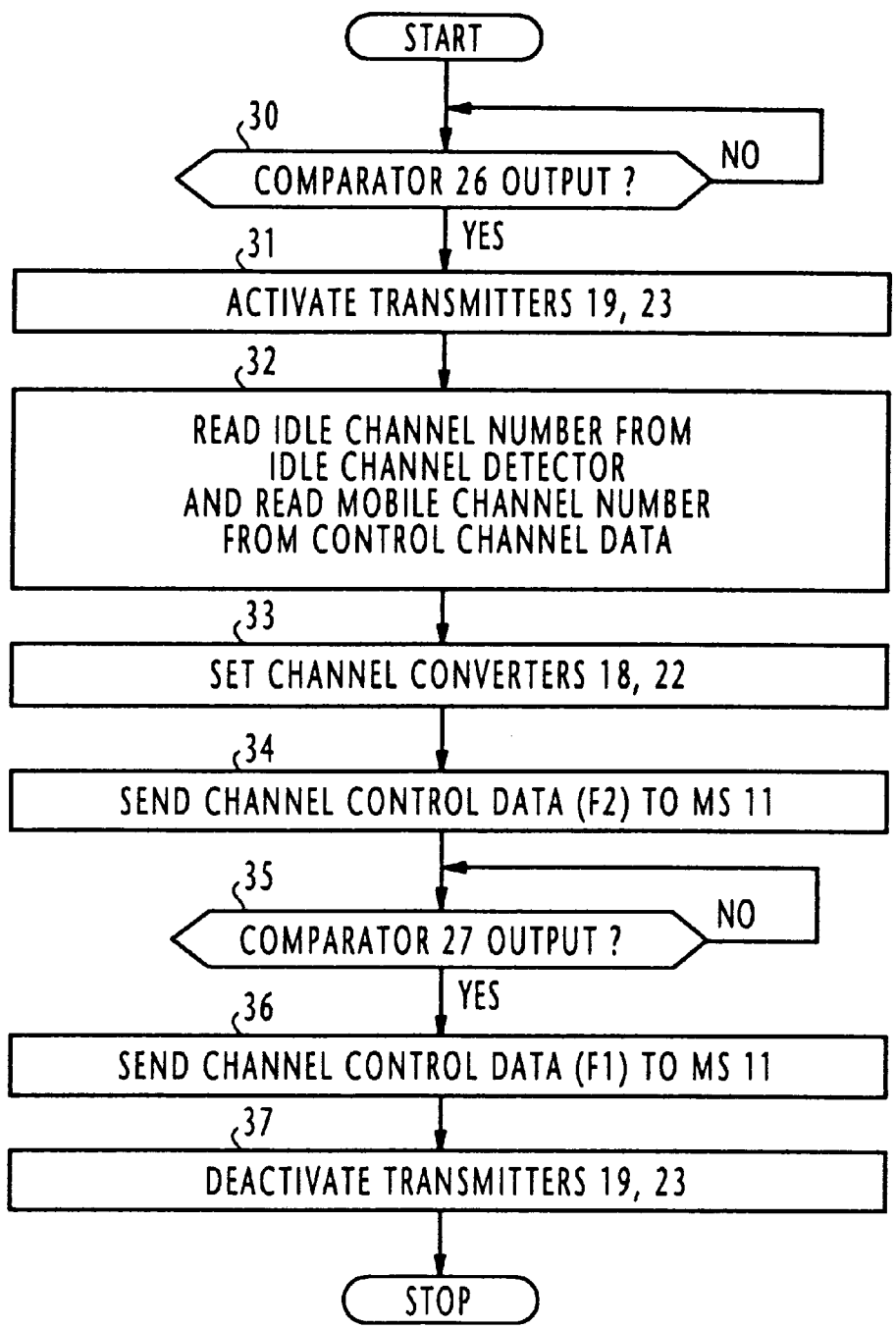
FIG. 2 is a flowchart of the channel switching operation of the controller of FIG. 1.

In FIG. 2, the channel switching operation of the controller 25 starts at step 30 when it receives the output signal from comparator 26, indicating that the mobile station 11 is entering the building 13 while communicating with the base station 10 over radio link 1 using forward and reverse channels F1 and R1. In response to the output signal from comparator 26, controller 25 turns on transmitters 19 and 23 (step 31).

At step 32, controller 25 reads idle channel data (F2, R2) from the idle channel detector 24 and mobile's channel number from control channel data (F1, R1) supplied from receiver 21. Controller 25 proceeds to step 33 to set channel conversion data to the forward and reverse channel converters 18 and 22 to cause them to perform forward channel conversion from F1 to F2 and reverse channel conversion from R2 to R1, respectively. Therefore, the output of the forward channel receiver 17 is converted to the forward channel F2 for local transmission to the mobile station 11 and the output of the reverse channel receiver 21 is converted to the reverse channel R1 for outdoor transmission to the base station 10.

At step 34, controller 25 produces channel control data that commands the mobile station to switch to indoor channels F2, R2 from outdoor channels F1, R1. This control data is supplied to the transmitter 19 where it is transmitted on the control channel to the mobile station. In response, the mobile station 11 switches its channels to the indoor channels F2 and R2.

Therefore, a communication path is established between the mobile station and base station via radio links 2 and 3, instead of radio link 1.

When the strength of the mobile-transmitted signal lowers below the second reference REF 2, it is determined that the mobile station is leaving the building while continuing the communication with the base station via links 2 and 3, and comparator 27 produces an output signal. Controller 25 responds to this signal (step 36) for transmitting channel control data through transmitter 19 to the mobile station so that it switches to outdoor channels F1, R1 from indoor channels F2, R2. At step 37, controller 25 turns off power amplifiers 19 and 23. Thus, the mobile station uses radio link 1, instead of links 2 and 3, to continue its communication with the base station.

What is claimed is:

1. A mobile communication method comprising the steps of:

providing first and second radio access points at different locations of a building structure that substantially prevents penetration of electromagnetic radiation, said second radio access point being at a position which allows substantial penetration of electromagnetic radiation;

receiving a signal at the first radio access point from a mobile station while the mobile station is communicating with a base station and determining that the mobile station is entering the structure when the received signal exceeds a predetermined reference level; and activating a radio link between the second radio access point and the base station and activating a circuit between the first and second radio access points, and commanding the mobile station to establish a radio link to the first radio access point.

2. A mobile communication method as claimed in claim 1, further comprising:

determining that the mobile station is leaving said structure when the received signal lowers below an additional reference level; and commanding the mobile station to establish a radio link to the base station.

3. A mobile communication method as claimed in claim 1 further comprising making a search through a spectrum of a mobile communication system at periodic intervals and detecting an idle channel which suffers no interference with other mobile stations, and communicating the detected idle channel to the mobile station to establish said radio link to the first radio access point.

4. A mobile communication system operating with a base station and a mobile station, comprising:

indoor and outdoor antennas at different locations of a building structure that substantially prevents penetration of electromagnetic radiation; and a communication unit connected between said indoor and outdoor antennas for detecting a signal received at said indoor antenna from the mobile station while the mobile station is communicating with the base station, determining that the mobile station is entering the structure when the detected signal exceeds a predetermined reference level and activating a radio link between the outdoor antenna and the base station and activating a circuit between the indoor and outdoor antennas and commanding the mobile station to establish a radio link to said indoor antenna, wherein said communication unit is designed and adapted so that no communication occurs in said link and said circuit prior to activating said link and said circuit.

5. The mobile communication system of claim 4, wherein said communication unit is arranged to determine that the mobile station is leaving the structure when the received signal falls below an additional reference level and commands the mobile station to establish a radio link to the base station.

6. A mobile communication system as claimed in claim 4, wherein said communication unit is arranged to make a search through a spectrum of a mobile communication system at periodic intervals and detects an idle channel which suffers no interference with other mobile stations, and commands the mobile station to establish said radio link to the indoor antenna according to the detected idle channel.

7. A mobile communication system as claimed in claim 4, wherein the communication unit comprises:

- a forward channel receiver for amplifying a signal received by the outdoor antenna;
- a forward channel converter connected to the forward channel receiver for performing channel conversion;
- a forward channel transmitter for amplifying an output signal of the forward channel converter for transmission from the indoor antenna;
- a reverse channel receiver for amplifying a signal received by the indoor antenna;
- a reverse channel converter connected to the output of the reverse channel receiver for performing channel conversion;
- a reverse channel transmitter for amplifying the output signal of the reverse channel converter for transmission from the outdoor antenna;
- a comparator for comparing the strength of a signal received by the indoor antenna with a reference level and for producing an output signal when said strength is higher than the reference level; and
- a controller responsive to the output signal from the comparator for commanding the forward channel converter to convert the output signal of the forward channel receiver from an outdoor forward channel to an indoor forward channel, commanding the reverse channel converter to convert the output signal of the reverse channel receiver from an indoor reverse channel to an outdoor reverse channel, and commanding the mobile station to switch to said indoor forward and reverse channels from the outdoor forward and reverse channels.

8. A mobile communication system as claimed in claim 7, wherein the communication unit further comprises:

- a second comparator for comparing the strength of said signal received by the indoor antenna with a second reference level and producing an output signal when said strength is lower than the second reference level; and
- said controller being responsive to the output signal from the second comparator for commanding the mobile station to switch to the outdoor forward and reverse channels and clear the indoor forward and reverse channels.

9. The mobile communication system of claim 7, further comprising an idle channel detector for detecting, at periodic intervals, an idle channel which suffers no interference with other mobile stations, said controller being responsive to the detected idle channel for determining said indoor forward and reverse channels.

10. The method of claim 5, further comprising the step of deactivating the radio link between the second radio access point and the base and deactivating the circuit between the first and second radio access points upon commanding the mobile station to establish a radio link to the base station.

* * * * *